(12) United States Patent
Davami

(10) Patent No.: US 9,581,357 B1
(45) Date of Patent: Feb. 28, 2017

(54) DYNAMIC ASYMMETRIC SOLAR CONCENTRATOR

(71) Applicant: Erfan Davami, Oviedo, FL (US)

(72) Inventor: Erfan Davami, Oviedo, FL (US)

( * ) Notice: Subject to any disclaimer, the term of this patent is extended or adjusted under 35 U.S.C. 154(b) by 1182 days.

(21) Appl. No.: 13/646,195

(22) Filed: Oct. 5, 2012

(51) Int. Cl.
| | | |
|---|---|---|
| *F24J 2/10* | (2006.01) | |
| *F24J 2/14* | (2006.01) | |
| *G02B 26/08* | (2006.01) | |

(52) U.S. Cl.
CPC .............. *F24J 2/14* (2013.01); *F24J 2/1052* (2013.01); *F24J 2/1057* (2013.01); *G02B 26/0825* (2013.01)

(58) Field of Classification Search
CPC ... Y02E 10/45; F24J 2/14; F24J 2/1052; F24J 2/1057; G02B 26/0825
USPC .................................................. 126/684–697
See application file for complete search history.

(56) References Cited

U.S. PATENT DOCUMENTS

| | | | | |
|---|---|---|---|---|
| 3,171,403 A | * | 3/1965 | Drescher | F24J 2/06 |
| | | | | 126/603 |
| 4,158,356 A | * | 6/1979 | Wininger | F24J 2/14 |
| | | | | 126/570 |
| 4,286,581 A | * | 9/1981 | Atkinson, Jr. | F24J 2/06 |
| | | | | 126/585 |
| 4,318,394 A | | 3/1982 | Alexander | |
| 4,439,020 A | * | 3/1984 | Maruko | F24J 2/06 |
| | | | | 126/573 |
| 4,655,563 A | | 4/1987 | Plante | |
| 4,841,946 A | * | 6/1989 | Marks | F24J 2/02 |
| | | | | 126/575 |
| 4,870,949 A | * | 10/1989 | Butler | F24J 2/12 |
| | | | | 126/571 |
| 4,927,249 A | | 5/1990 | Wisner | |
| 4,934,803 A | | 6/1990 | Ealey | |
| 5,051,571 A | | 9/1991 | Brown | |
| 5,195,503 A | * | 3/1993 | Ludlow | F03G 6/065 |
| | | | | 126/586 |
| 5,204,784 A | | 4/1993 | Spinhirne | |
| 5,238,210 A | * | 8/1993 | Heitzmann | B64G 1/10 |
| | | | | 126/683 |
| 5,593,549 A | | 1/1997 | Stirbl | |
| 5,956,191 A | | 9/1999 | Blackmon | |
| 5,986,795 A | | 11/1999 | Chapman | |
| 6,128,135 A | * | 10/2000 | Stiles | F21S 11/00 |
| | | | | 359/597 |
| 6,485,152 B2 | | 11/2002 | Wood | |
| 6,691,701 B1 | * | 2/2004 | Roth | F24J 2/18 |
| | | | | 126/600 |

(Continued)

*Primary Examiner* — Avinash Savani
*Assistant Examiner* — Deepak Deean
(74) *Attorney, Agent, or Firm* — Brian S. Steinberger; Law Offices of Brian S. Steinberger, P.A.

(57) ABSTRACT

Solar energy concentration systems and methods that includes a curved lower solar reflective dish, and a smaller curved solar concentrator located on a focal line above the dish. The dish reflects input light rays onto the smaller curved solar concentrator. Moveable supports adjusts the shape of the deformable solar concentrator mounted directly below the concentrator to receive concentrated light rays reflected from the concentrator. A controller for storing and executing a set of instruction controls the shape of the concentrator to focus the reflected concentrated light rays onto a focal collector. A mirror point list adjusts the shape of the concentrator based on a sun angle.

20 Claims, 11 Drawing Sheets

(56) References Cited

U.S. PATENT DOCUMENTS

| | | | |
|---|---|---|---|
| 6,942,352 B2 | 9/2005 | Bennett | |
| 7,247,790 B2 | 7/2007 | Rabinowitz | |
| 7,374,302 B2* | 5/2008 | Griffith | G02B 26/06 359/846 |
| 7,443,619 B2* | 10/2008 | Sakino | G02B 7/183 359/819 |
| 8,118,440 B1 | 2/2012 | Luebke | |
| 8,184,372 B1* | 5/2012 | Gu | H01L 31/058 359/597 |
| 8,292,441 B2* | 10/2012 | Hutchin | G02B 26/0825 359/849 |
| 9,188,714 B2* | 11/2015 | Gandhi | G02B 5/10 |
| 2005/0200984 A1* | 9/2005 | Browne | B60R 1/08 359/846 |
| 2011/0155123 A1* | 6/2011 | Clue | F24J 2/12 126/640 |
| 2012/0042949 A1* | 2/2012 | Shifman | H01L 31/18 136/259 |
| 2012/0228883 A1* | 9/2012 | Cwik | F24J 2/38 290/1 R |
| 2013/0008487 A1* | 1/2013 | Cheng | F24J 2/067 136/248 |
| 2013/0306139 A1* | 11/2013 | Bostwick | H01L 31/058 136/248 |
| 2015/0000278 A1* | 1/2015 | Furutani | F24J 2/5427 60/641.15 |

* cited by examiner

DYNAMIC ASYMMETRIC SOLAR CONCENTRATOR

FIELD OF THE INVENTION

This invention relates to solar energy and, in particular, to methods, systems and devices for a dynamic asymmetric solar concentrator using a computer algorithm to obtain a dynamic geometry to focus a parallel array of beams to a singular point with minimum rotation, translation and scale of the geometry. One of many uses of such obtained shape is in solar concentration mirrors to provide a bi-rotational structure while preserving the low cost uni-rotational body.

BACKGROUND AND PRIOR ART

Conventional parabolic reflectors have a static (unchangeable) geometry thus the entire reflector has to be rotated in a way to always face the sun. In large scales were the reflector becomes heavy, rotating the structure could become expensive.

U.S. Publication 2012/0042949 (Shifman; Eli) describes a solar concentrator where the reflector can be either spherical or aspherical shaped, paragraph 49.

Publications and patents that describe various types of concave curved deformable mirrors where the reflective surface can be adjusted by actuators (such as pistons) to change focus concentration include U.S. Publication 2005/0200984 (Browne, Alan L. et al.) describes active mirror assemblies; U.S. Pat. No. 8,118,440 issued to David Patrick Luebke describes a capture system and method equipped with at least one steerable deflecting mirror (see FIG. 5, #506); U.S. Pat. No. 6,485,152 issued to Doug Wood describes a matrix solar dish; U.S. Pat. No. 5,986,795 Issued to Harry Chapman et al. describes a deformable mirror for short wavelength applications; U.S. Pat. No. 5,956,191 issued to James Blackmon. et al. describes a light weight reflector facet; U.S. Pat. No. 5,593,549 issued to Robert C. Stirbl et al. describes a method for changing solar energy distribution; and U.S. Pat. No. 4,318,394 issued to William C. Alexander describes a solar energy concentrator.

U.S. Pat. No. 7,247,790 (Rabinowitz; Mario) describes a system that utilizes a dynamic spinning ensemble of mini-mirrors to both concentrate and modulate rays from the sun onto a photovoltaic collector array.; U.S. Pat. No. 5,204,784 (Spinhirne; James M.) describes a deformable mirror with pneumatic actuator pre-load; U.S. Pat. No. 5,051,571 (Brown, Jr.; Wilbur P. et al.) describes a cascaded adaptive optics system; U.S. Pat. No. 4,934,803 (Ealey; Mark A.) describes a differential pressure deformable mirror; U.S. Pat. No. 4,927,249 (Wisner; George R.) describes an electromechanical light chopper arrangement; and U.S. Pat. No. 4,655,563 (Plante; Roland L. et al.) describes a variable thickness deformable mirror. Each of these describes planar deformable mirror reflectors that also have reflective surfaces that can be selectively deformed.

U.S. Pat. No. 6,942,352 issued to Harold Earl Bennett et al. describes transfer optics mirror that is shaped by a plurality of piezoelectric actuators connectors to push/pull rods spread evenly over the back surface of the thin mirror a distance determined by the mirror's influence function. The mirror is held by a support with the same coefficient of expansion as the mirror so external heating and cooling does not distort the mirror. The actuators are connected to a computer so each is separately controlled to contour the mirror as desired.

To solve the problems associated with the prior art solar generation systems, what is needed is a solar concentrator system that includes a deformable mirror to reflect concentrated solar rays to a single point for solar or thermal collection.

SUMMARY OF THE INVENTION

A primary objective of the present invention is to provide methods and systems for a dynamic asymmetric solar concentrator that uses a computer algorithm to obtain a dynamic geometry to focus a parallel array of beams to a singular point with minimum rotation, translation and scale of the geometry.

A secondary objective of the present invention is to provide methods and systems for a deformable mirror with controllable movement achieved by placing mechanical/hydraulic lifts under the reflector or applying couple moments at the two ends of the mirror.

A third objective of the present invention is to provide methods, systems and devices for a solar thermal concentration unit that provides an angle dependant reflection curve to focus an array of beams on a certain point with the two ends of the curve being relatively stationary. The solar concentration mirrors can be used for concentrating solar energy to produce heat or electricity.

A fourth objective of the present invention is to provide methods, systems and devices for a solar thermal concentration unit that provides a shape for solar concentration mirrors that always face the sun with minimal movement. The solar concentration mirrors can be made of any bendable reflective surface, such as an acrylic or metallic mirror and the like.

A version of the solar energy concentration system can include a curved lower solar reflective dish, a curved solar concentrator that is smaller than the curved solar reflective dish located on the focal line of the curved solar reflective dish a distance above the curved solar reflective dish, the curved solar reflective dish reflecting input light rays onto the smaller curved solar concentrator, a deformable solar concentrator with moveable supports to adjust a shape of the deformable solar concentrator mounted directly below the curved solar concentrator to receive the concentrated light rays reflected from the curved solar concentrator, the deformable solar concentrator having a width W and length L, a controller for storing and executing a set of instruction to control a shape of the deformable concentrator to focus the reflected concentrated light rays onto a focal collector, and a mirror point list used by the controller to adjust the shape of the deformable solar concentrator based on a sun angle.

The curved solar reflective dish can include a curved semi cylindrical shaped solar reflector. The semi cylindrical shaped solar reflective dish can include one of an acrylic and a metallic mirror. The curved solar concentrator can be semi cylindrical. The semi cylindrical solar concentrator can include one of an acrylic and a metallic mirror.

The movable supports can include plural independent pistons to separately move up and down to adjust the shape of the deformable solar concentrator. The movable supports can include plural independent mechanical/hydraulic lifts under the deformable solar concentration to separately move up and down to adjust the shape of the deformable solar concentrator. The movable supports can include plural piezoelectric actuators connectors to push/pull rods spread evenly under the deformable solar concentrator to separately move up and down to adjust the shape of the deformable solar concentrator. The movable supports can include coupling moments at each of the two ends of the deformable solar concentrator.

The deformable solar concentrator can include one of an acrylic and a metallic mirror. The focal collector can be a solar collector or an array of solar collectors. Alternatively, the focal collector can be a solar thermal conversion device. The solar thermal conversion device can be a sterling engine or a hint sink.

The system can include a computer algorithm can be used for generating the mirror point list used by the controller to control the movable lifts to adjust shape of the deformable solar concentrator based on the sun angle.

The computer algorithm can include the steps of: step a, initializing the algorithm for the selected deformable solar concentrator width W, and length L, a selected sun angle sa, and a point of origin op; step b, initially setting a current point cp on the curve as the point of origin op; step c, defining a focal point of the sun ray using the point of origin op; step d, setting a section length for each next iteration of the algorithm, the section length being a distance from a last calculated point to a next current point; step e, adding the section length to the current point cp as the next current point; step f, determining if all next current points along a length of the deformable mirror have been calculated, if yes go to step t, if no go to step g; step g, adding each next current point to a mirror point list in memory to determine an asymmetric curve of the deformable mirror; step h, calculating a slope of the input sun ray at the current point on the deformable mirror; step i, calculating a slope of the reflected beam from the current point on the deformable mirror using the focal point and the current point; step k, determining if the slope of the input beam is approximately equal to infinity; step 1, when the slope of the input beam is not equal to infinity, jumping to step n and when the slope of the input beam is equal to infinity, setting a variable z equal to the slope of reflection then going to step n; m determining if the focal point fp.x at x is greater than the current point cp.x at x, setting variable dir to minus one (−1), otherwise setting variable dir to plus one (+1), then go to step r; step n setting variable z according to $$z = \frac{mb * mr - 1}{mb + mr}$$

where mb is the slope of the input beam onto the deformable mirror, and mr is slope of the reflection from the deformable mirror; o calculating variable delta according to $$\text{delta} = \frac{\text{atan}(mb) + \text{atan}(mr)}{-\text{atan}(mb) + \text{atan}(mr)};$$

step p, setting variable dir equal to minus one (−1) when delta is greater than or equal to zero, otherwise setting variable dir equal to plus one (+1); step r calculating a slope of the deformable mirror according to $$mm = z + dir * \sqrt{(z^2 + 1)};$$

step s calculating a next current point cp.x and cp.y from the current points cp.x and cp.y according to next cp.x=cp.x+section length*cos(atan(mm)); next cp.y=cp.y+section length*sin(atan(mm)), where atan (mm) is the arc tangent of the slope of the mirror; cp.x is the horizontal component of the current point along the deformable mirror, and cp.y is the vertical component of the current point along the deformable mirror; step t rescale the mirror point list mpl is rescaled to fit the width W, wherein the mirror point list represents the shape of the mirror based on the sun angle sa; and step u, changing the shape of the deformable mirror can or each angle of the sun sa using the mirror point list.

Step d can include setting the section length equal to approximately 1 millimeter (0.001 m). The step of calculating the slope can include the step of: using the sun angle sa, the slope of the input beam is calculated as tan(sa).

The invention can include an algorithm method for calculating a curve of a deformable solar concentrator executable on a computer system, the method comprising the steps of: a initializing the algorithm for the selected deformable mirror width W, and length L, a selected sun angle sa, and a point of origin op; b initially setting a current point cp on the curve as the point of origin op; c defining a focal point of the sun ray using the point of origin op; d setting a section length for each next iteration of the algorithm, the section length being a distance from a last calculated point to a next current point; e adding the section length to the current point cp as the next current point; f determining if all next current points along a length of the deformable mirror have been calculated, if yes go to step t, if no go to step g; g adding each next current point to a mirror point list in memory to determine an asymmetric curve of the deformable mirror; h calculating a slope of the input sun ray at the current point on the deformable mirror; i calculating a slope of the reflected beam from the current point on the deformable mirror using the focal point and the current point; k determining if the slope of the input beam is approximately equal to infinity; l when the slope of the input beam is not equal to infinity, jumping to step n and when the slope of the input beam is equal to infinity, setting a variable z equal to the slope of reflection then going to step n; m determining if the focal point fp.x at x is greater than the current point cp.x at x, setting variable dir to minus one (−1), otherwise setting variable dir to plus one (+1), then go to step r; n setting variable z according to $$z = \frac{mb * mr - 1}{mb + mr}$$

where mb is the slope of the input beam onto the deformable mirror, and mr is slope of the reflection from the deformable mirror; o calculating variable delta according to $$\text{delta} = \frac{\text{atan}(mb) + \text{atan}(mr)}{-\text{atan}(mb) + \text{atan}(mr)};$$

p setting variable dir equal to minus one (−1) when delta is greater than or equal to zero, otherwise setting variable dir equal to plus one (+1); r calculating a slope of the deformable mirror according to $$mm = z + dir * \sqrt{(z^2 + 1)};$$

s calculating a next current point cp.x and cp.y from the current points cp.x and cp.y according to next cp.x=cp.x+section length*cos(atan(mm)), next cp.y=cp.y+section length*sin(atan(mm)), where atan (mm) is the arc tangent of the slope of the mirror; cp.x is the horizontal component of the current point along the deformable mirror, and cp.y is the vertical component of the current point along the deformable mirror; t rescale the mirror point list mpl is rescaled to fit the width W, wherein the mirror point list represents the shape of the mirror based on the sun angle sa; and u changing the shape of the deformable mirror can or each angle of the sun sa using the mirror point list.

The initializing step can include the steps of selecting a width W of the deformable mirror, a selected sun angle sa between approximately 90 degrees and approximately 30 degrees, and a point of origin op 0, 0 in two-dimensional space at a far left point on the deformable mirror. The defining step can include the step of using a default position of the focal point at (W/2, W/4).

The focal point can include a point above the curve depending on the application.

The step of calculating a slope of the reflected beam comprises the step of calculating the slope of the reflection according to $$mr = \frac{fp.y - cp.y}{fp.x - cp.x}$$

where
mr is the slope of reflection from the deformable mirror, fp is the focal point
cp is the current point along the deformable mirror being calculated.

Further objects and advantages of this invention will be apparent from the following detailed description of preferred embodiments which are illustrated schematically in the accompanying drawings.

DESCRIPTION OF THE PREFERRED EMBODIMENTS

Figure 1:
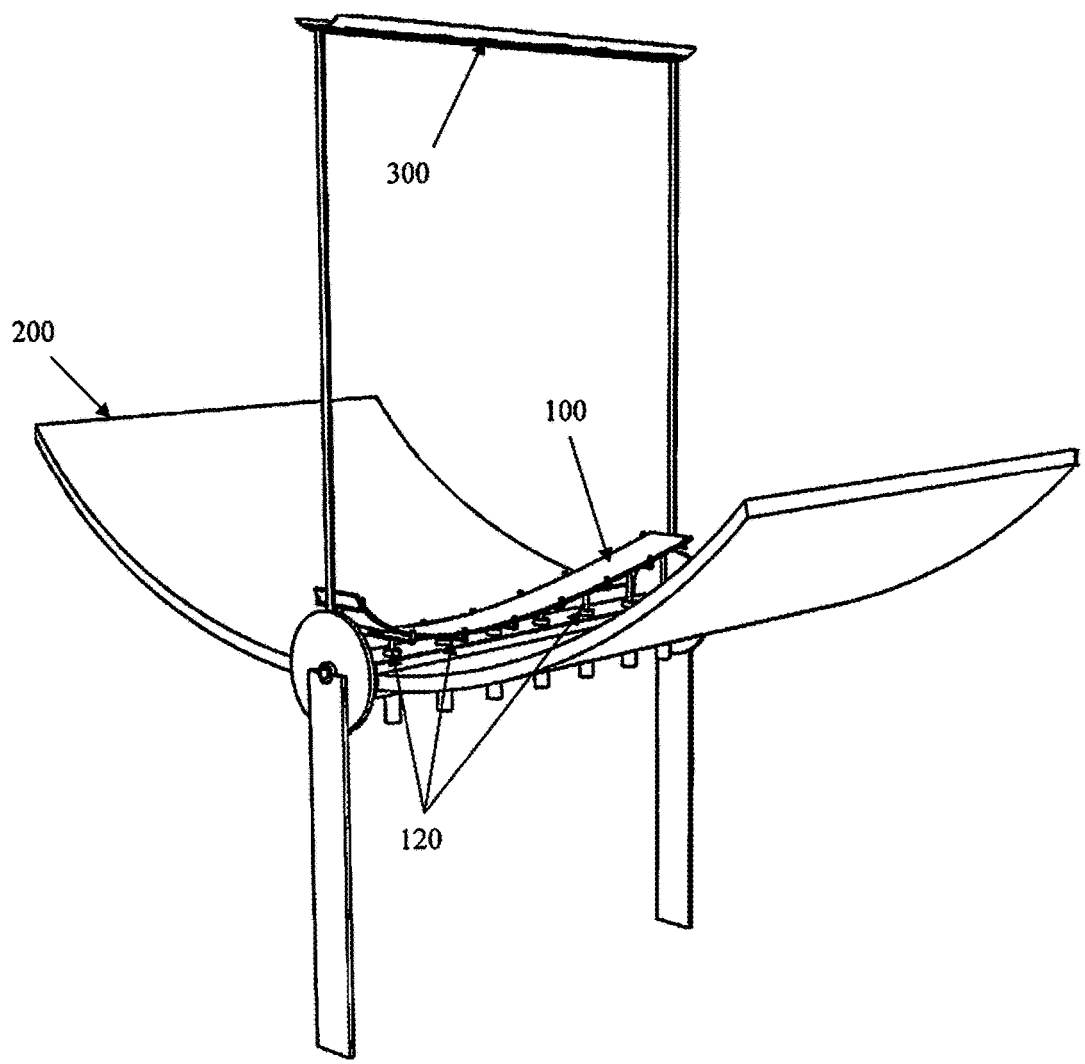
FIG. 1 is a perspective view of a dynamic asymmetric solar concentrator system according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
100 deformable concentrator
120 mechanical/hydraulic lifts
130 deformable mirror base
150 focal collector
200 cylindrical reflector
300. collimator
400 controller
500 algorithm The methods and systems of the present invention provides a deformable reflector mounted on a conventional cylindrical mirror using a computer algorithm to obtain a dynamic geometry to focus a parallel array of beams from the deformable reflector to a singular point with minimum rotation, translation and scale of the geometry. One of many uses of such obtained shape is in solar concentration mirrors to eliminate the need of one dimension of the tracking process.

Figure 2:
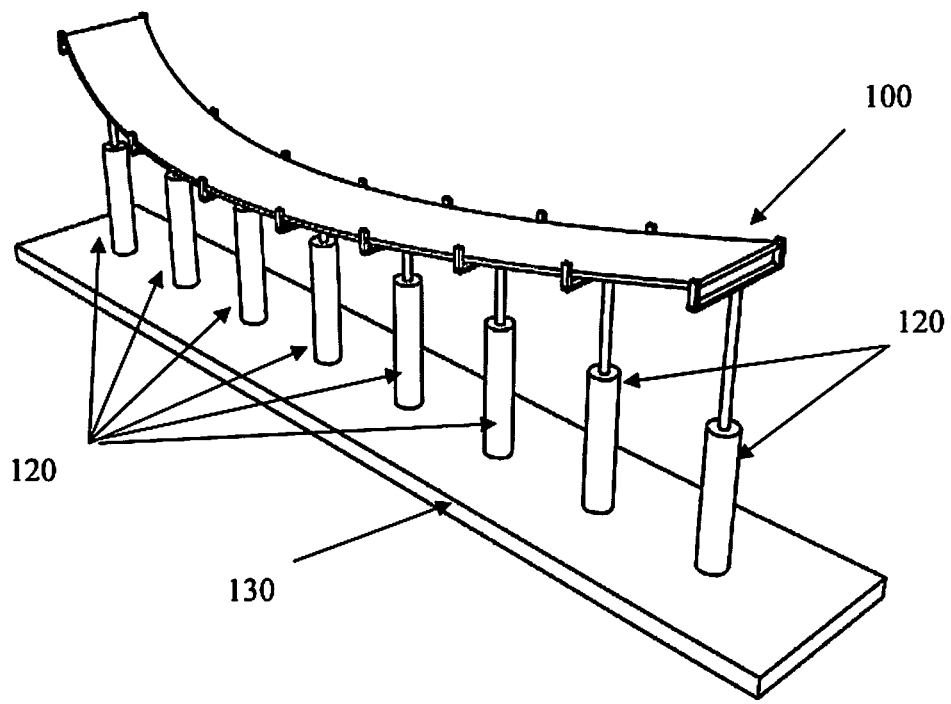
FIG. 2 is a perspective view of the deformable concentrator.
Figure 3:
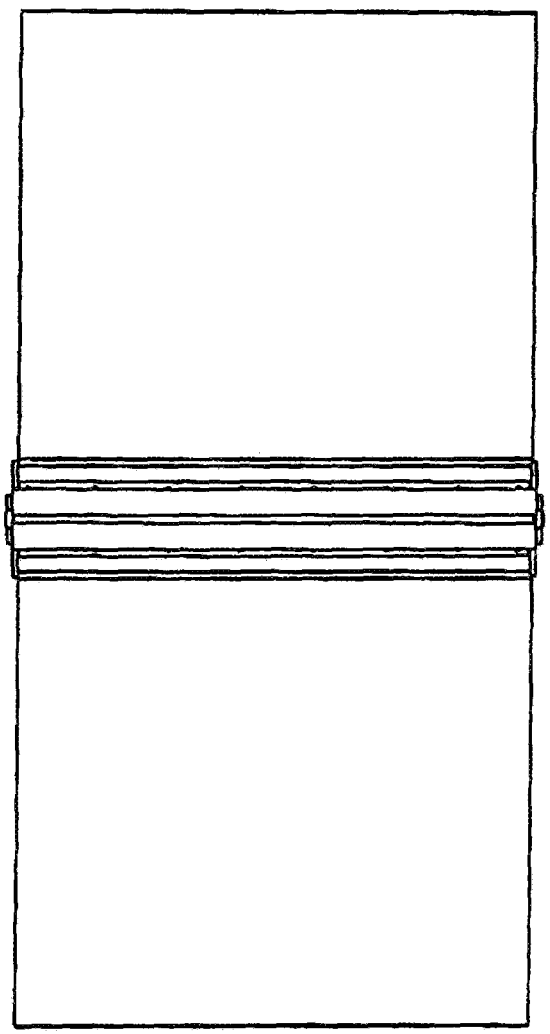
FIG. 3 is a top view of the dynamic asymmetric solar concentrator shown in FIG. 1.

FIG. 1 is a perspective view of a dynamic asymmetric solar concentrator system according to the present invention. An asymmetric mirror reflector is mounted to a platform or directly on the surface of the curved, cylindrical, reflector with moveable supports, such as pistons or actuators as shown in FIG. 2. As the sun moves across the earth, each of the movable supports can separately move up and down to adjust the mirror surface in order to optimize focusing the reflector at all times of the day (or all times of the year depending on the application). Clearly, this mirror surface is flexible and not rigid and the solar collector does not rotate or pivot as is done in the prior art.

Figure 4A:
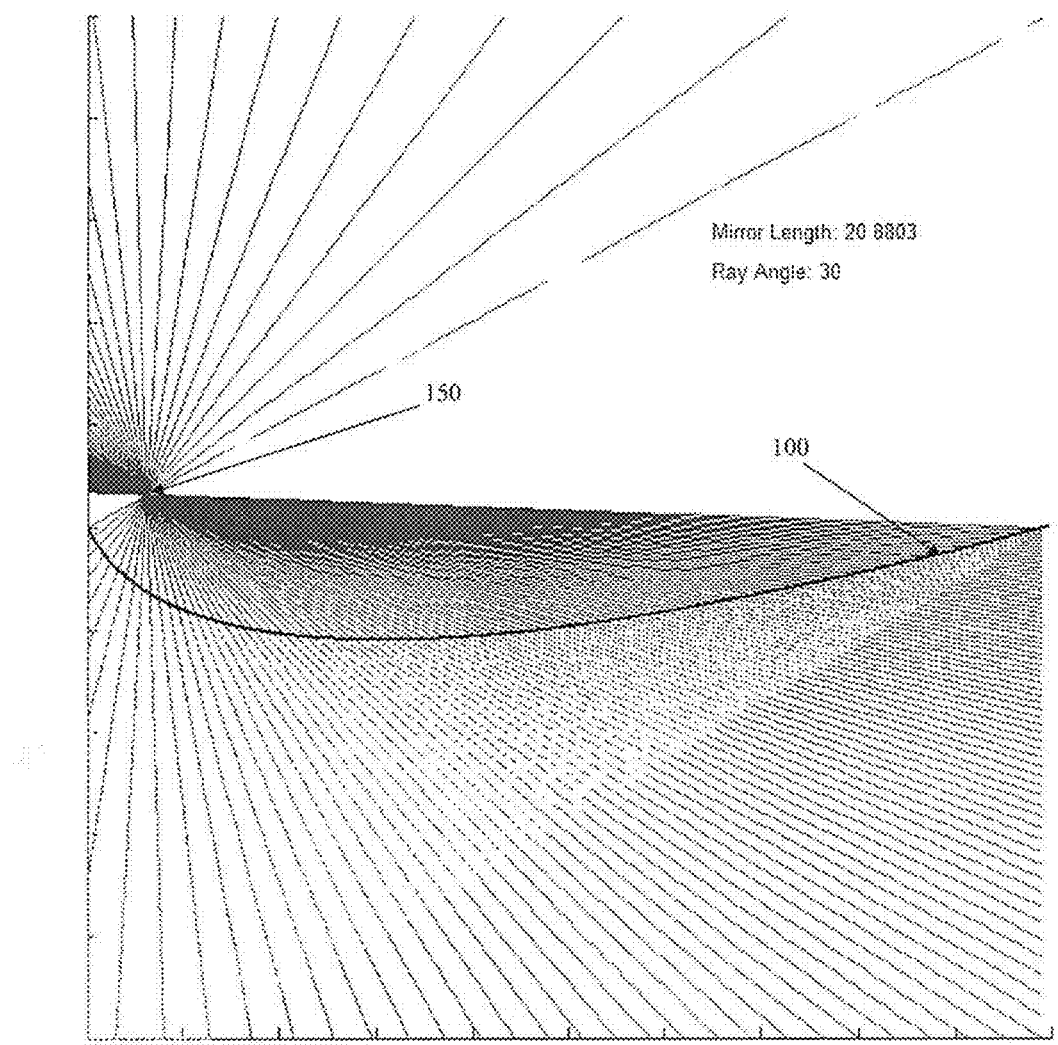
FIG. 4*a* shows an example of plural linear components with a ray angle of 30 degrees.
Figure 4B:
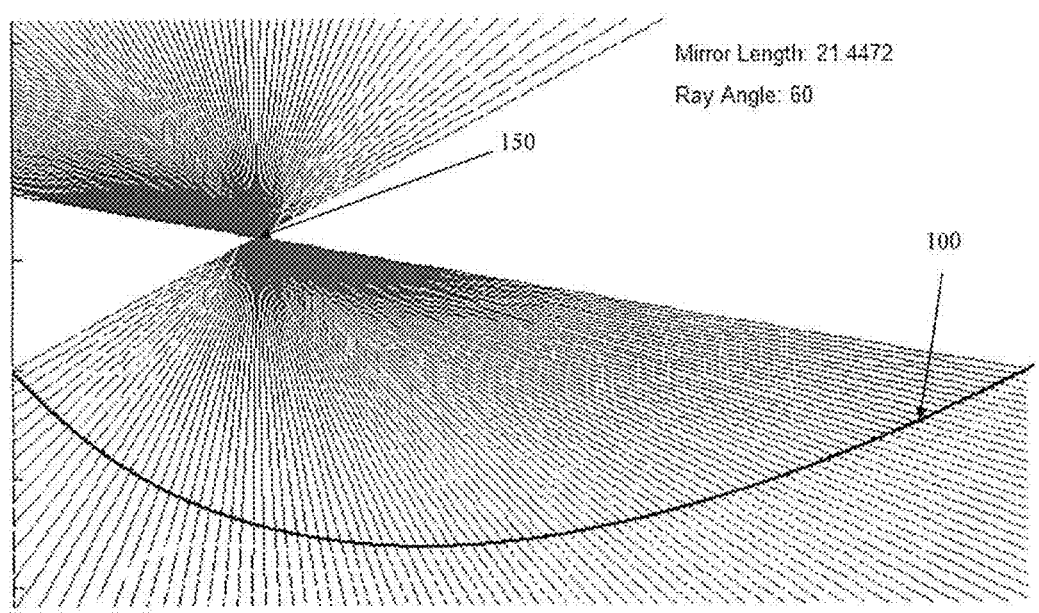
FIG. 4*b* shows an example of plural linear components with a ray angle of 60 degrees.
Figure 4C:
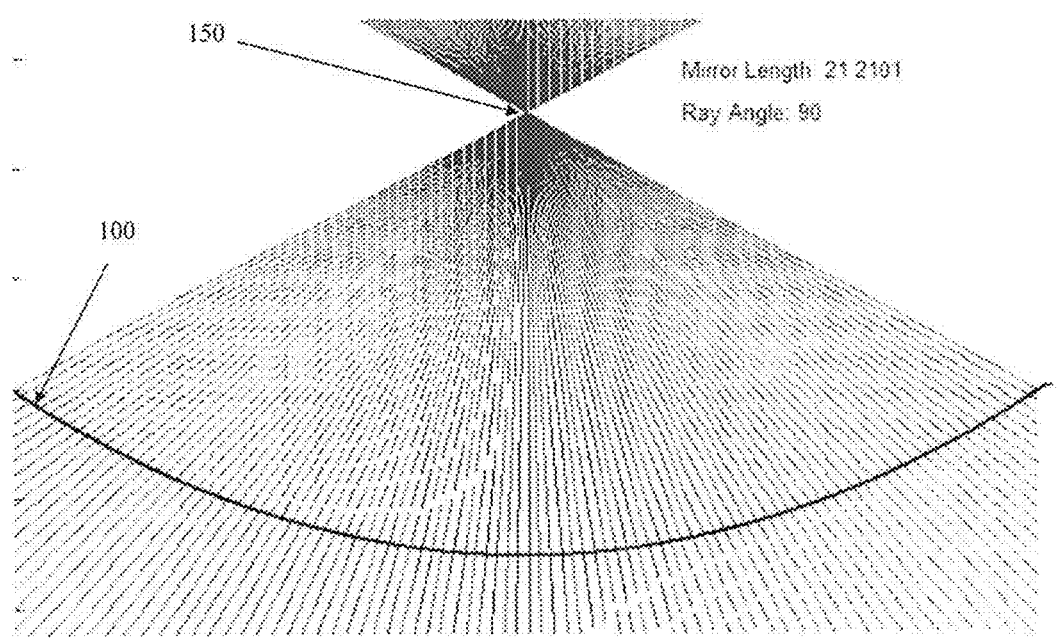
FIG. 4*c* shows an example of plural linear components with a ray angle of 90 degrees.

The deformable reflector of the present invention provides an angle dependant reflection curve to focus an array of beams on a certain point with the two ends of the curve being relatively stationary as shown in FIGS. 4*a*-4*c*. The invention provides a controller to control the movable lifts and thereby provide a shape for solar concentration mirrors that always concentrates sun light, with minimal movement using any bendable reflective surface like an acrylic or metallic mirror. The invention can be used for concentrating solar energy to produce electrical energy or heat by placement of a focal point collector to receive the beams reflected from the deformable reflective surface. In large scale applications, many of these independent solar thermal units can be attached to each other along their rotation axis.

FIG. 1 is a perspective view showing a solar thermal concentration system that includes a deformable concentrator 100 having a width W mounted on a conventional cylindrical mirror shown as a big U-shaped mirror 200, a collimator 300 placed on the focal line of the conventional cylindrical mirror that collimates the reflected beams from the conventional cylindrical mirror back down as parallel beams from the small U-shaped mirror at the very top 120, coupled with a controller executing an algorithm that changes the configuration of the deformable concentrator 100 to obtain a dynamic geometry to focus a parallel array of light beams to a singular point with a minimum rotation, translation and scale of the geometry.

FIG. 2 is a perspective view of the deformable concentrator 100 with controllable movement achieved by placing mechanical/hydraulic lifts 120 under the deformable concentrator or applying couple moments at the two ends of the deformable concentrator. The deformable asymmetric mirror focuses the beams from the collimator to a single focal point. A solar collector or a solar thermal conversion device such as a sterling engine or a heat-sink or a fiber optic receiver can be placed at the focal point.

Given an array of parallel beams having a defined angle with the horizon, it is necessary to determine a curve that focuses all the rays reflected from the deformable mirror on a single point. This curve C has a length L and is made up of many smaller linear components each having a length of dl and an angle α (l). Each one of these infinitely small linear components must satisfy two criteria. First, each linear component must reflect its incoming solar beam toward a specific point P. Second, each linear component must be attached to the end of the previous linear component, where the first linear component starts from the origin. FIGS. 4a-4c show examples of plural linear components reflected from the deformable concentrator each focused on the common point P.

For simplicity if we assume the entire curve is made up of a finite number of small linear components N and each sub-curve has a length of δ, the curve C would have a recursive equation that will result in concentration geometry shown in FIGS. 4a, 4b and 4c. Each one of the examples illustrates the curve for a different ray angle. In FIG. 4a, the ray angle is 30 degrees, FIG. 4b illustrates a ray angle of 60 degrees and in FIG. 4c the ray angle is 90 degrees. In large scale applications, many of these independent solar thermal units can be attached to each other along their rotation axis.

Figure 5:
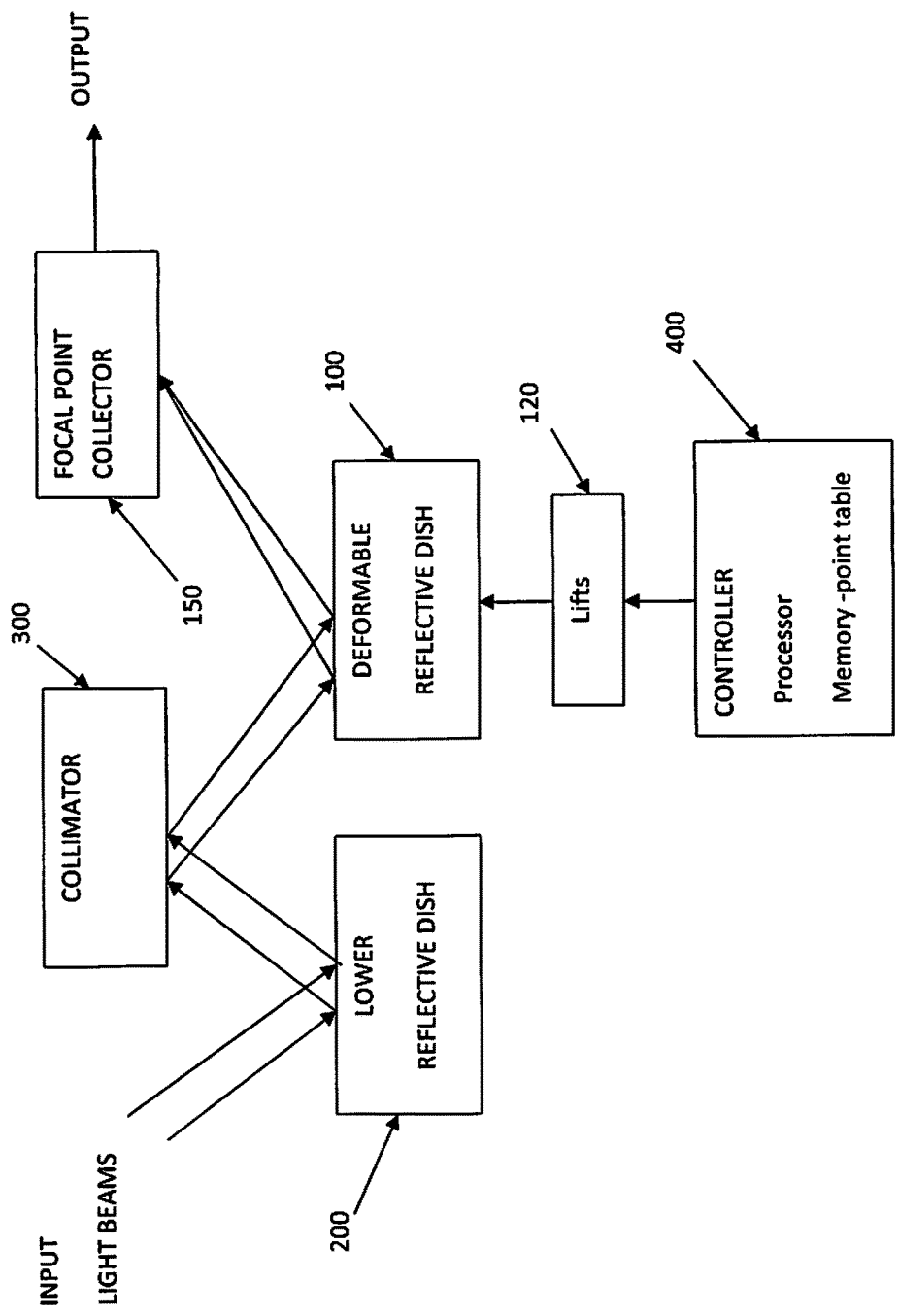
FIG. 5 is a schematic block diagram of the asymmetric solar concentrator system.
Figure 6A:
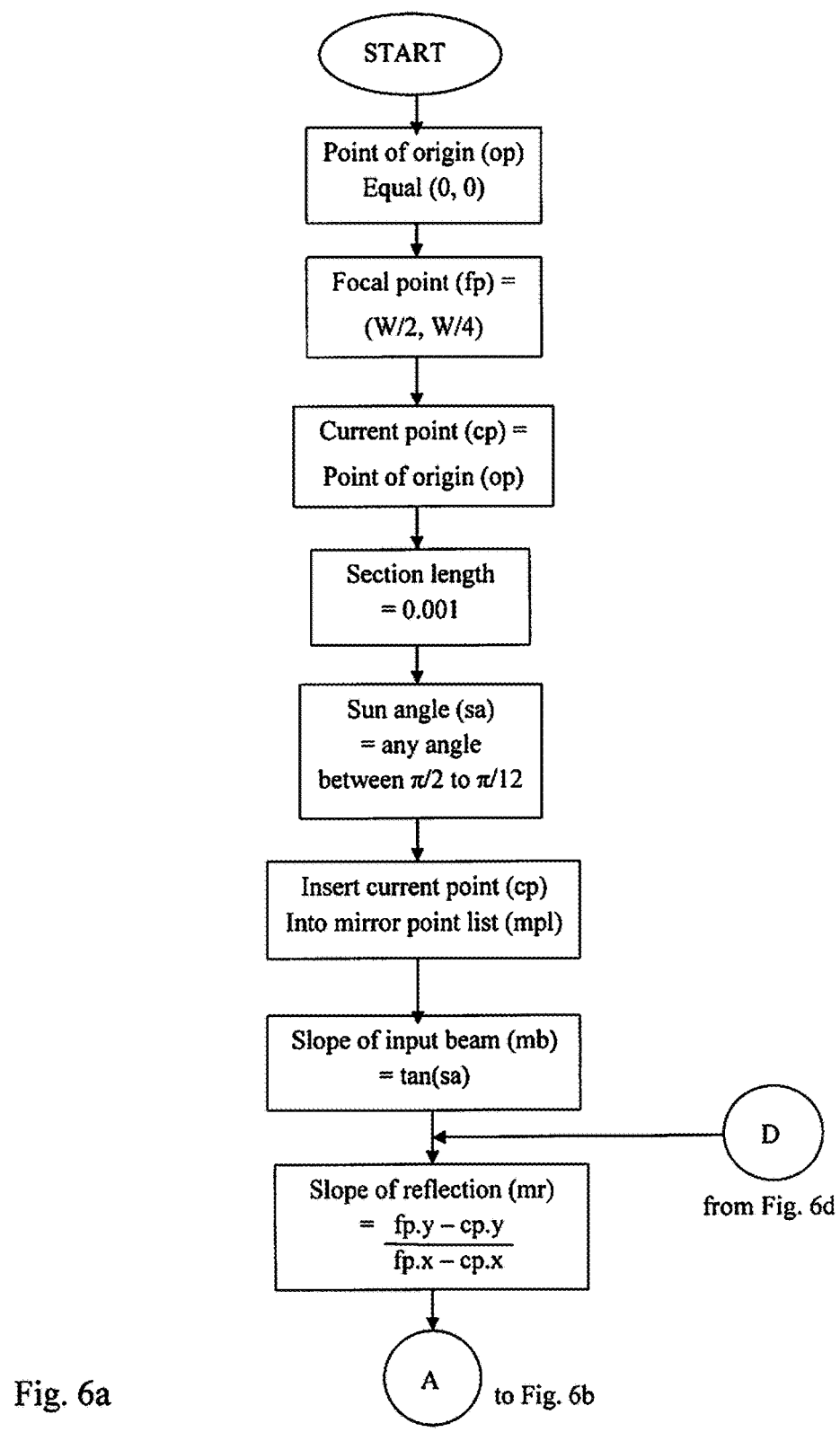
FIGS. 6*a*, 6*b*, 6*c* and 6*d* cover a flowchart of an algorithm used for calculating the shape of the deformable mirror for plural sun angles.
Figure 6B:
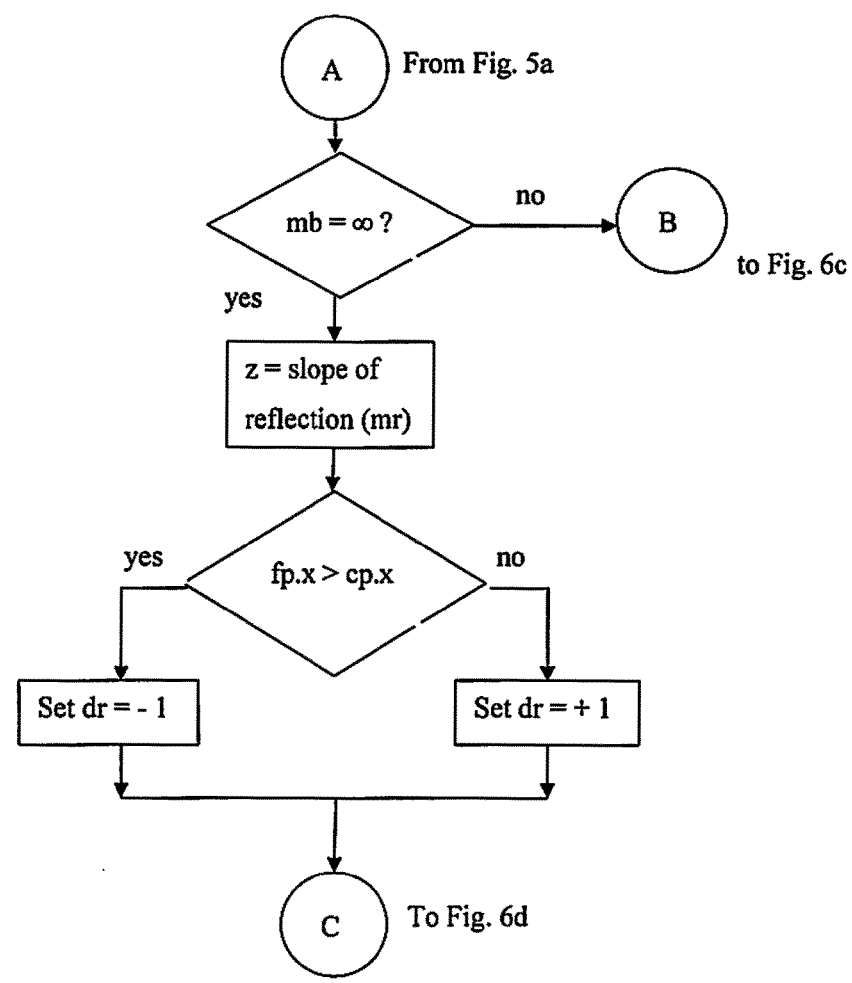
Figure 6C:
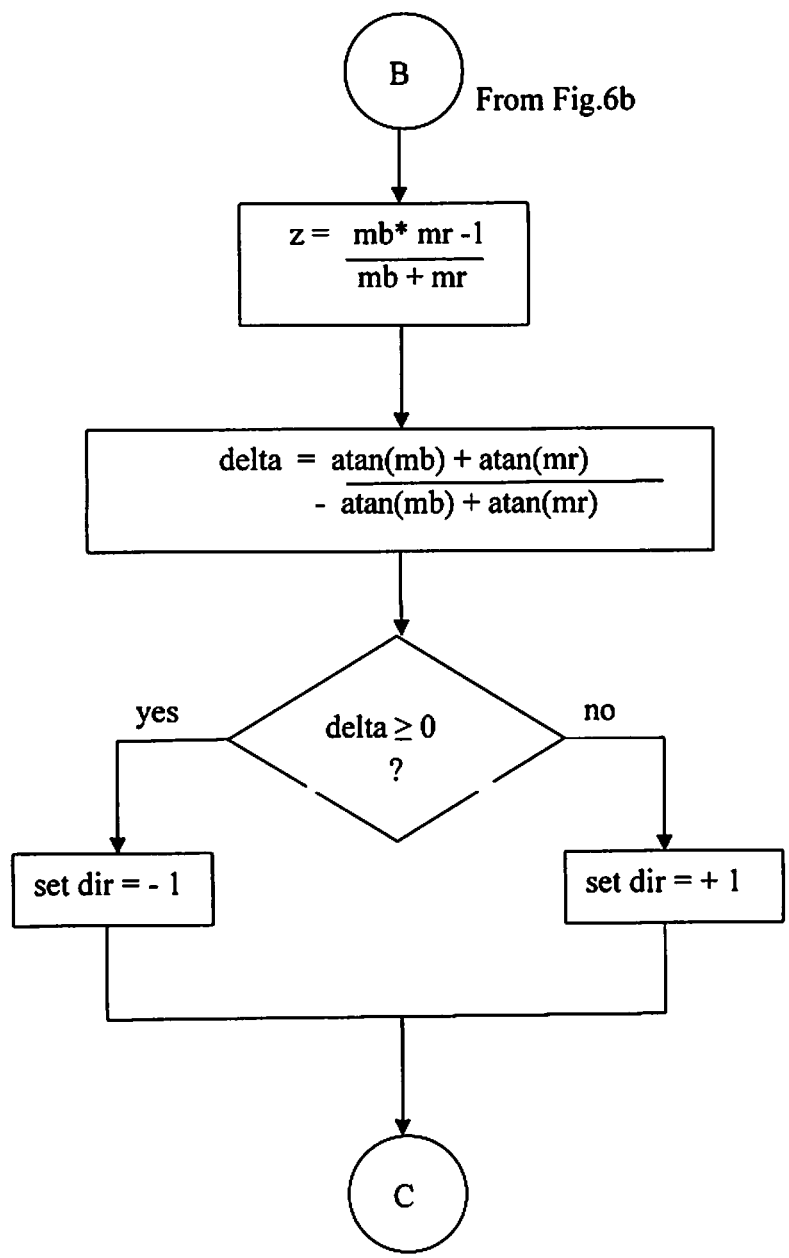
Figure 6D:
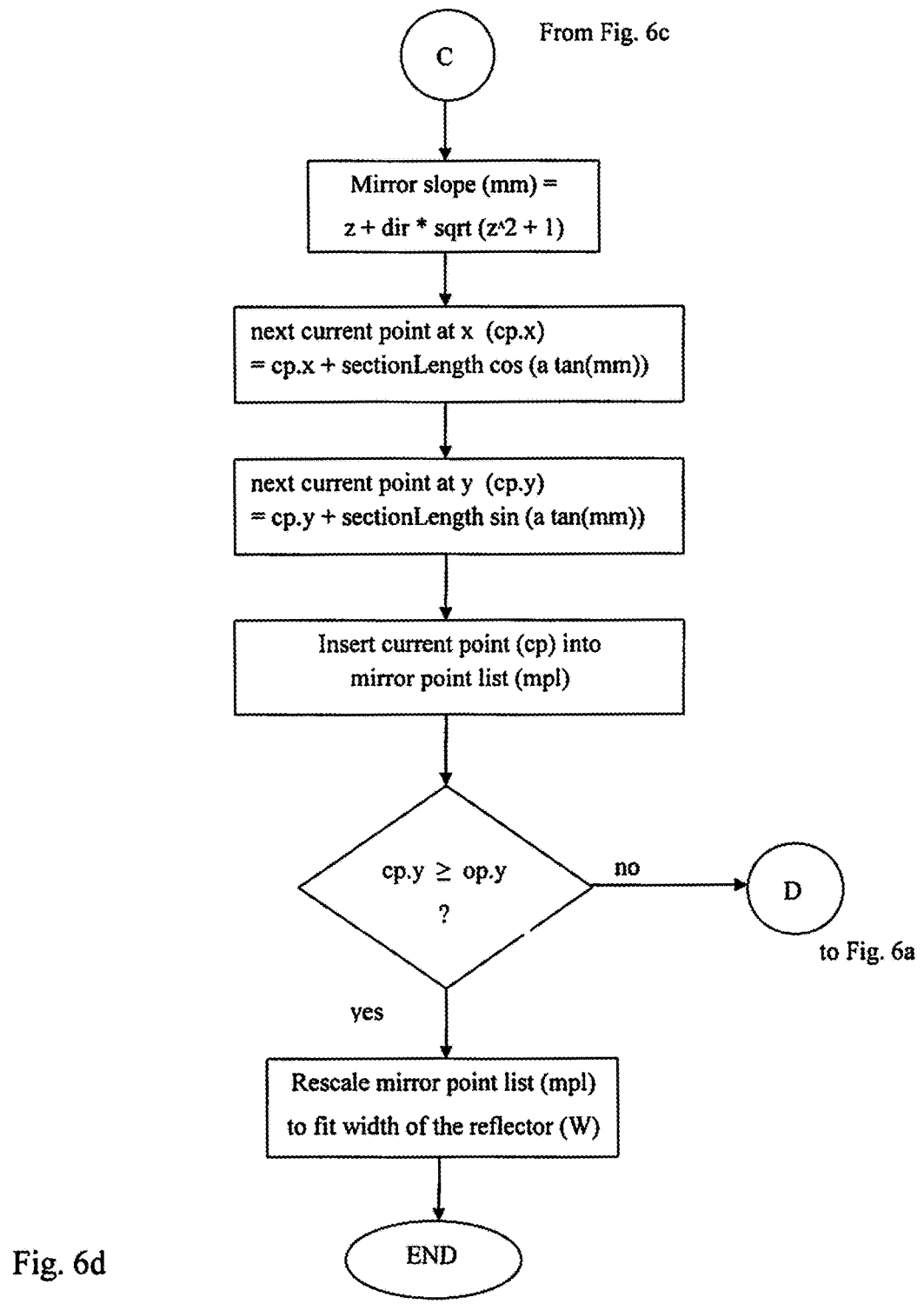

FIG. 5 is a schematic block diagram of the dynamic asymmetric solar concentrating system according to a preferred embodiment of the present invention. As shown in FIG. 1 in conjunction with FIG. 5, the system includes a curved lower reflective dish 200, such as a cylindrical shaped dish, an upper curved reflective dish 300 that is smaller than the lower reflective dish with the same convexity 200 and a deformable reflective mirror mounted within the lower curved dish 200. The curved lower reflective dish 200 reflects incoming light beams and reflects them toward a curved upper reflective dish that that is smaller than the curved lower reflective dish 200.

The lower and upper reflective dishes are curved such that approximately all of the reflected beams from the lower dish are received by the upper reflective dish. Since the upper reflective dish is smaller than the curved upper dish 300, the beam are collimated, or concentrated, onto the smaller surface area. The deformable reflective surface is approximately directly below the upper curved reflective surface such that the concentrated light beams from the upper curved reflective surface are parallel beams directed toward the deformable reflective surface 100.

Depending on the time of day, the deformable reflective mirror 100 is controllably shaped to focus the incoming light beams reflected from the upper curved reflector 300 to a single focal point. A focal collector (FIGS. 4a, 4b and 4c) is positioned at the focal point and the deformable is continuously adjusted to reflect concentrated light beams toward the focal collector. The focal collector 150 can be a solar collected to convert the concentrated light beams into an electrical output. Alternatively, the focal collector can be a thermal collector to convert the heat generated by the concentrated light beam to thermal energy.

FIGS. 6a, 6b, 6c and 6d are a flowchart of the algorithm used for achieving the shape of the deformable mirror. The points referenced in the flowchart such as op, fp, cp, etc are points in the 2-D space, thus the points have a horizontal and vertical component, respectively along the x and y axis, referred to as .x and .y. For example, cp.x refers to the horizontal component of cp.

The customer application of the deformable mirror determines the width W of the deformable mirror. When the system is initialized there are two known variables, the deformable mirror width W and the sun angle sa. The width is any value in mirrors and the sun angle is between 90 degrees to 0 degrees (Horizoon). The curve determined in the algorithm is determined for sun angle sa between approximately 30 degrees and approximately 90 degrees ($\pi/2$ to $\pi/12$ and W=20 m). For the first step, the point of origin is 0, 0 which is a point in two-dimensional space and is at the far left point on the deformable mirror. For this point, each next point depends on the previous calculated point.

Using the point of origin op that is always (0,0), then the focal point is defined where all of the sun rays point. The default position of the focal point is at (W/2, W/4) but could be located anywhere above the curve depending on the application. Initially, the current point cp on the curve is the point of origin op. In the next step the section length is set to approximately 1 millimeter (0.001 m). The section length is the distance from the last calculated point to the current point. The calculations repeats for each next one millimeter distance until all of the points along the mirror have been determined to build a mirror point list mpl to determine the asymmetric curve that the mirror looks like. At this step in the algorithm, the steps are performed to figure out what the curve of the mirror initially looks like, starting at the origin (0, 0) for a specific sun angle sa and mirror length W.

Still referring to FIG. 5a, Using the sun angle sa, the slope of the input beam is calculated as tan(sa). In the next step, the slope of the reflection mr is calculated according to $$mr = \frac{fp.y - cp.y}{fp.x - cp.x}$$

where
mr is the slope of reflection from the deformable mirror
fp is the focal point
cp is the current point along the deformable mirror being calculated Moving next to the decision step, the slope of the input beam and the slope of the reflection are known. Referring to FIG. 5b, when the slope of the input beam is equal to infinity, the variable z is set equal to the slope of reflection. Then when the focal point fp.x at x is greater than the current point cp.x at x, the variable dir is set to minus one (−1). Conversely, when the focal point fp.x at x is less than the current point cp.x at x, the variable dir is set to plus one (+1). Note that dir is not an abbreviation, dir is another variable in the calculation and is either set to +1 or −1.

Referring to FIG. 5b in conjunction with FIG. 5c, when the slope of the input beam mb is not equal to infinity, the variable z is set according to $$z = \frac{mb * mr - 1}{mb + mr}$$

where
z is a variable
mb is the slope of the input beam onto the deformable mirror
mr is slope of the reflection from the deformable mirror
Still referring to FIG. 5c, next delta is calculated according to $$\text{delta} = \frac{\text{atan}(mb) + \text{atan}(mr)}{-\text{atan}(mb) + \text{atan}(mr)};$$

When delta is greater than or equal to zero, variable dir is set equal to minus one (−1) and when delta is less than zero, variable dir is set equal to plus one (+1).

Referring to FIG. 5d, after the variable dir is set in both branches from the decision block mb=∞, the slope of the mirror mm is calculated according to $$mm = z + dir * \sqrt{(z^2+1)}$$

Using the slope of the mirror mm, the next current points cp.x and cp.y are calculated from the current points cp.x and cp.y according to next cp.x=cp.x+section length*cos(atan(mm))

next cp.y=cp.y+section length*sin(atan(mm)) where section length=1 millimeter (0.001)
atan (mm) is the arc tangent of the slope of the mirror
cp.x is the horizontal component of the current point along the deformable mirror
cp.y is the vertical component of the current point along the deformable mirror
The current point cp is inserted into the mirror point list mpl and if the current point is not greater than or equal to the point of origin op, the algorithm loops back to the calculating the slope of reflection step. The loop continues building the mirror point list until all points along the mirror have been calculated.

In the last step, the mirror point list is rescaled to fit the width W originally set as a known parameter by the customer. In other words, the scale of the curve (the mirror point list) is changed to fit the width W. At this point, the mirror point list represents the shape of the mirror based on the sun angle sa. Using the mirror point list mpl created by the algorithm, the shape of the deformable mirror can be changed for each angle of the sun sa since the mirror point list has been rescaled to fit the selected width W.

Such Geometry is capable of reflecting an array of sunlight beams to a focal point with minimal movement. Conventional parabolic reflectors have a static (unchangeable) geometry thus the entire reflector has to be rotated in a way to always face the sun. In large scales were the reflector becomes heavy, rotating the structure could become expensive. The deformable shown in FIG. 2, once mounted on a cylindrical solar thermal unit as shown in FIG. 1 concentrates sunlight on a singular point just like conventional spherical parabolic concentration mirrors. The primary advantage of the system is the replacement of a 2-dimensional axis rotation (rotation along the azimuth or elevation angles), rotation during the hours of the day and the days of the year with a 1-dimensional axis rotation during selected hours of the day or selected days of the year depending on the application, and shape deformation of the deformable mirror with minimal movement throughout the day or year either along the azimuth or elevation angles. The movement of the deformable mirror according to the present invention is achieved by placing mechanical/hydraulic lifts under the reflector as shown in FIG. 2 or applying coupling moments at the two ends of the mirror.

While the algorithm is described and illustrated for generating a point list for use with a deformable mirror within a solar collection system, the point list can also be used to determine a shape of an optical lens. FIGS. 4a, 4b and 4c illustrate both the deformable concentrator 100 where the light beams are reflected and also shows the optical lens embodiment with the light beams passing through the curved surface 100 can be the boundary of the optical lens.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A solar energy concentration system comprising:
    a curved lower solar reflective dish;
    a curved solar concentrator that is smaller than the curved solar reflective dish located on the focal line of the curved solar reflective dish a distance above the curved solar reflective dish, the curved solar reflective dish reflecting input light rays onto the curved solar concentrator;
    a deformable solar concentrator with moveable supports to adjust a shape of the deformable solar concentrator mounted directly below the curved solar concentrator to receive the concentrated light rays reflected from the curved solar concentrator, the deformable solar concentrator having a width W and length L;
    a controller for storing and executing a set of instruction to control a shape of the deformable concentrator to focus the reflected concentrated light rays onto a focal collector that comprises a solar thermal device selected from one of a sterling engine and a heat sink and a fiber optics collector; and
    a mirror point list used by the controller to adjust the shape of the deformable solar concentrator based on a sun angle, wherein the solar energy concentration system only has one dimensional axis of rotation during operation.

2. The system of claim 1 wherein the curved solar reflective dish is a curved semi cylindrical shaped solar reflector.

3. The system of claim 2 wherein the curved semi cylindrical shaped solar reflective dish comprises: one of an acrylic and a metallic mirror.

4. The system of claim 2 wherein the curved solar concentrator is semi cylindrical.

5. The system of claim 4 wherein the curved solar concentrator comprises:
    one of an acrylic and a metallic mirror.

6. The system of claim 1 wherein the movable supports comprise:
    plural independent pistons to separately move up and down to adjust the shape of the deformable solar concentrator.

7. The system of claim 1 wherein the movable supports comprise:
    plural independent mechanical and hydraulic lifts under the deformable solar concentrator to separately move up and down to adjust the shape of the concentrator.

8. The system of claim 1 wherein the movable supports comprise:
    plural piezoelectric actuators connectors to push/pull rods spread evenly under the deformable solar concentrator to separately move up and down to adjust the shape of the concentrator.

9. The system of claim 1 wherein the deformable solar concentrator comprises:
    one of an acrylic and a metallic mirror.

10. The system of claim 1 wherein the focal collector comprises: a solar collector.

11. The system of claim 10, wherein the solar collector comprises:
    an array of solar collectors.

12. A solar energy concentration system comprising:
    a curved lower solar reflective dish;
    a curved solar concentrator that is smaller than the curved solar reflective dish located on the focal line of the curved solar reflective dish a distance above the curved solar reflective dish, the curved solar reflective dish reflecting input light rays onto the curved solar concentrator;

a deformable solar concentrator with moveable supports to adjust a shape of the deformable solar concentrator mounted directly below the curved solar concentrator to receive the concentrated light rays reflected from the curved solar concentrator, the deformable solar concentrator having a width W and length L;

a controller for storing and executing a set of instruction to control a shape of the deformable concentrator to focus the reflected concentrated light rays onto a focal collector;

a mirror point list used by the controller to adjust the shape of the deformable solar concentrator based on a sun angle; and wherein the controller is configured to perform a computer algorithm for generating the mirror point list used by the controller to control the movable lifts to adjust shape of the deformable solar concentrator based on the sun angle.

13. The system of claim 12 wherein the computer algorithm comprises:

a initializing the algorithm for the selected deformable solar concentrator width W, and length L, a selected sun angle sa, and a point of origin op;

b initially setting a current point cp on the curve as the point of origin op;

c defining a focal point of the sun ray using the point of origin op;

d setting a section length for each next iteration of the algorithm, the section length being a distance from a last calculated point to a next current point;

e adding the section length to the current point cp as the next current point;

f determining if all next current points along a length of the deformable mirror have been calculated, if yes go to step t, if no go to step g;

g adding each next current point to a mirror point list in memory to determine an asymmetric curve of the deformable mirror;

h calculating a slope of the input sun ray at the current point on the deformable mirror;

i calculating a slope of the reflected beam from the current point on the deformable mirror using the focal point and the current point;

k determining if the slope of the input beam is approximately equal to infinity;

l when the slope of the input beam is not equal to infinity, jumping to step n and when the slope of the input beam is equal to infinity, setting a variable z equal to the slope of reflection then going to step n;

m determining if the focal point fp.x at x is greater than the current point cp.x at x, setting variable dir to minus one (−1), otherwise setting variable dir to plus one (+1), then go to step r;

n setting variable z according to $$z = \frac{mb * mr - 1}{mb + mr}$$

where mb is the slope of the input beam onto the deformable mirror, and mr is slope of the reflection from the deformable mirror;

o calculating variable delta according to $$\text{delta} = \frac{\text{atan}(mb) + \text{atan}(mr)}{-\text{atan}(mb) + \text{atan}(mr)};$$

p setting variable dir equal to minus one (−1) when delta is greater than or equal to zero, otherwise setting variable dir equal to plus one (+1);

r calculating a slope of the deformable mirror according to $$mm = z + dir * \sqrt{(z^2 + 1)};$$

s calculating a next current point cp.x and cp.y from the current points cp.x and cp.y according to next $cp.x = cp.x + \text{section length} * \cos(\text{atan}(mm))$ next $cp.y = cp.y + \text{section length} * \sin(\text{atan}(mm))$ where atan (mm) is the arc tangent of the slope of the mirror, cp.x is the horizontal component of the current point along the deformable mirror, and cp.y is the vertical component of the current point along the deformable mirror;

t rescale the mirror point list mpl is rescaled to fit the width W, wherein the mirror point list represents the shape of the mirror based on the sun angle sa; and u changing the shape of the deformable mirror can or each angle of the sun sa using the mirror point list.

14. The system of claim 13 wherein step d comprises:

setting the section length equal to approximately 1 millimeter (0.001 m).

15. The system of claim 14 wherein calculating the slope comprises the step of: using the sun angle sa, the slope of the input beam is calculated as tan(sa).

16. An algorithm method for calculating a curve of a deformable solar concentrator executable on a computer system, the method comprising the steps of:

a. providing a curved lower solar reflective dish;

b. providing a curved solar concentrator that is smaller than the curved solar reflective dish located on the focal line of the curved solar reflective dish a distance above the curved solar reflective dish, the curved solar reflective dish reflecting input light rays onto the curved solar concentrator;

c. providing a deformable solar concentrator with moveable supports to adjust a shape of the deformable solar concentrator mounted directly below the curved solar concentrator to receive the concentrated light rays reflected from the curved solar concentrator, the deformable solar concentrator having a selected deformable mirror;

d. initializing the algorithm for the selected deformable mirror width W, and length L, a selected sun angle sa, and a point of origin op;

e. initially setting a current point cp on the curve as the point of origin op;

f. defining a focal point of the sun ray using the point of origin op;

g. setting a section length for each next iteration of the algorithm, the section length being a distance from a last calculated point to a next current point;

h. adding the section length to the current point cp as the next current point;

i. determining if all next current points along a length of the selected deformable mirror have been calculated, if yes go to step t, if no go to step g;

j. adding each next current point to a mirror point list in memory to determine an asymmetric curve of the selected deformable mirror;

k. h calculating a slope of the input sun ray at the current point on the selected deformable mirror;
l. calculating a slope of the reflected beam from the current point on the deformable mirror using the focal point and the current point;
m. determining if the slope of the input beam is approximately equal to infinity;
n. when the slope of the input beam is not equal to infinity, jumping to step n and when the slope of the input beam is equal to infinity, setting a variable z equal to the slope of reflection then going to step n;
o. determining if the focal point fp.x at x is greater than the current point cp.x at x, setting variable dir to minus one (−1), otherwise setting variable dir to plus one (+1), then go to step r;
p. setting variable z according to $$z = \frac{mb*mr - 1}{mb + mr}$$

where
mb is the slope of the input beam onto the deformable mirror, and
mr is slope of the reflection from the deformable mirror;
q. calculating variable delta according to $$\text{delta} = \frac{\text{atan}(mb) + \text{atan}(mr)}{-\text{atan}(mb) + \text{atan}(mr)};$$

r. setting variable dir equal to minus one (−1) when delta is greater than or equal to zero, otherwise setting variable dir equal to plus one (+1);
s. calculating a slope of the selected deformable mirror according to $$mm = z + dir*\sqrt{(z^2 + 1)};$$

t. calculating a next current point cp.x and cp.y from the current points cp.x and cp.y according to next $cp.x = cp.x + $section length$*\cos(\text{atan}(mm))$, next $cp.y = cp.y + $section length$*\sin(\text{atan}(mm))$ where atan (mm) is the arc tangent of the slope of the selected deformable mirror,
cp.x is the horizontal component of the current point along the selected deformable mirror, and
cp.y is the vertical component of the current point along the selected deformable mirror;
   u. rescale the mirror point list mpl is rescaled to fit the width W, wherein the mirror point list represents the shape of the selected deformable mirror based on the sun angle sa; and
   v. changing the shape of the selected deformable mirror can or each angle of the sun sa using the selected deformable mirror point list.

17. The method of claim 16, wherein the initializing step comprises the steps of: selecting a width W of the selected deformable mirror, a selected sun angle sa between approximately 90 degrees and approximately 30 degrees, and a point of origin op 0, 0 in two-dimensional space at a far left point on the selected deformable mirror.

18. The method of claim 16, wherein the defining step comprises the step of: using a default position of the focal point at (W/2, W/4).

19. The method of claim 18 wherein the focal point is a point above the curve depending on the application.

20. The method of claim 16, wherein the calculating a slope of the reflected beam comprises the step of: Calculating the slope of the reflection according to $$mr = \frac{fp.y - cp.y}{fp.x - cp.x}$$

where
   mr is the slope of reflection from the selected deformable mirror;
   fp is the focal point; and
   cp is the current point along the selected deformable mirror being calculated.

* * * * *